United States Patent [19]
Brent et al.

[11] Patent Number: 5,642,818
[45] Date of Patent: Jul. 1, 1997

[54] STRUCTURE FOR SUPPORTING ARTICLES AGAINST VEHICLES

[75] Inventors: Adam Brent, 2631 W. Estes, Chicago, Ill. 60645; Jill R. Shimabukuro, Chicago, Ill.

[73] Assignee: Adam Brent, Chicago, Ill.

[21] Appl. No.: 489,893

[22] Filed: Jun. 13, 1995

[51] Int. Cl.$^6$ ..................................................... A47F 5/00
[52] U.S. Cl. ................... 211/70.5; 211/123; 211/105.6; 224/117.5; 224/551; 224/560
[58] Field of Search ............................ 211/70.5, 64, 94, 211/105.6, 123, 70.8, 70.6; 224/917.5, 551, 482, 558, 560, 570

[56] References Cited

U.S. PATENT DOCUMENTS

| | | | |
|---|---|---|---|
| 1,118,157 | 11/1914 | Shive | 211/105.6 X |
| 2,589,348 | 3/1952 | Diefenbach | 224/560 X |
| 2,594,491 | 6/1952 | Persons . | |
| 2,704,224 | 3/1955 | Banks . | |
| 2,889,165 | 6/1959 | Zientara . | |
| 3,266,633 | 8/1966 | Graebner | 211/70.8 |
| 3,338,422 | 8/1967 | Hickok . | |
| 3,410,512 | 11/1968 | Del Vecchio et al. | 211/105.6 X |
| 3,622,057 | 11/1971 | Marker | 224/917.5 X |
| 3,636,739 | 1/1972 | Smedley . | |
| 3,685,667 | 8/1972 | Bell . | |
| 4,077,544 | 3/1978 | Goode . | |
| 4,231,501 | 11/1980 | Goode . | |
| 4,707,009 | 11/1987 | Barnett . | |
| 4,750,767 | 6/1988 | Barnett . | |
| 4,785,980 | 11/1988 | Redick . | |
| 5,056,820 | 10/1991 | Des Prez . | |
| 5,129,677 | 7/1992 | Marshall . | |
| 5,285,906 | 2/1994 | Wisnowski et al. . | |

FOREIGN PATENT DOCUMENTS

| | | | |
|---|---|---|---|
| 917408 | 9/1954 | Germany | 224/917.5 |
| 602066 | 7/1978 | Switzerland | 211/70.5 |

OTHER PUBLICATIONS

*SKI*, Dec. 1994, page of advertising illustrating the Ski-Stander magnetic ski holder.

Primary Examiner—Robert W. Gibson, Jr.
Attorney, Agent, or Firm—Lockwood, Alex, Fitzgibbon & Cummings

[57] ABSTRACT

A structure for supporting articles, such as skis in vertical orientation off of a vehicle includes an elongated, adjustable support bar having engagement clips disposed on opposite ends of the support bar. The engagement clips are interconnected by a resilient member extending through the support bar to apply an inwardly directed retention force to the clips. One or more article support members extend transversely from the support bar.

19 Claims, 3 Drawing Sheets

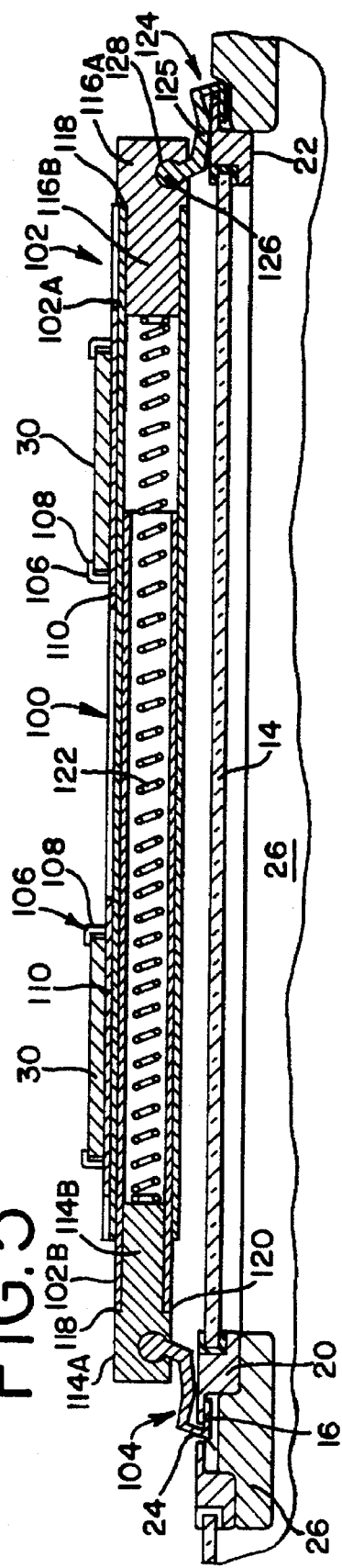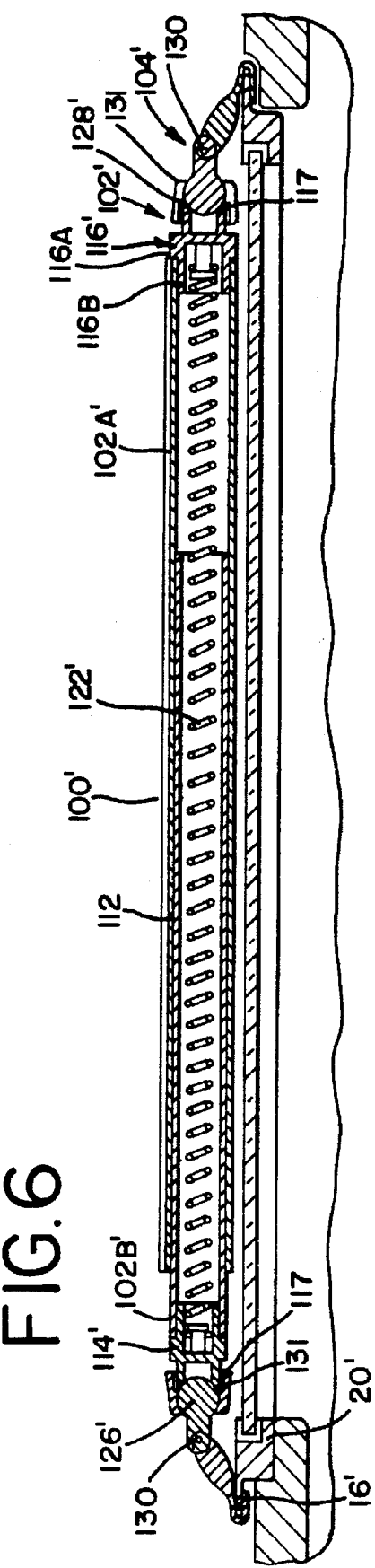

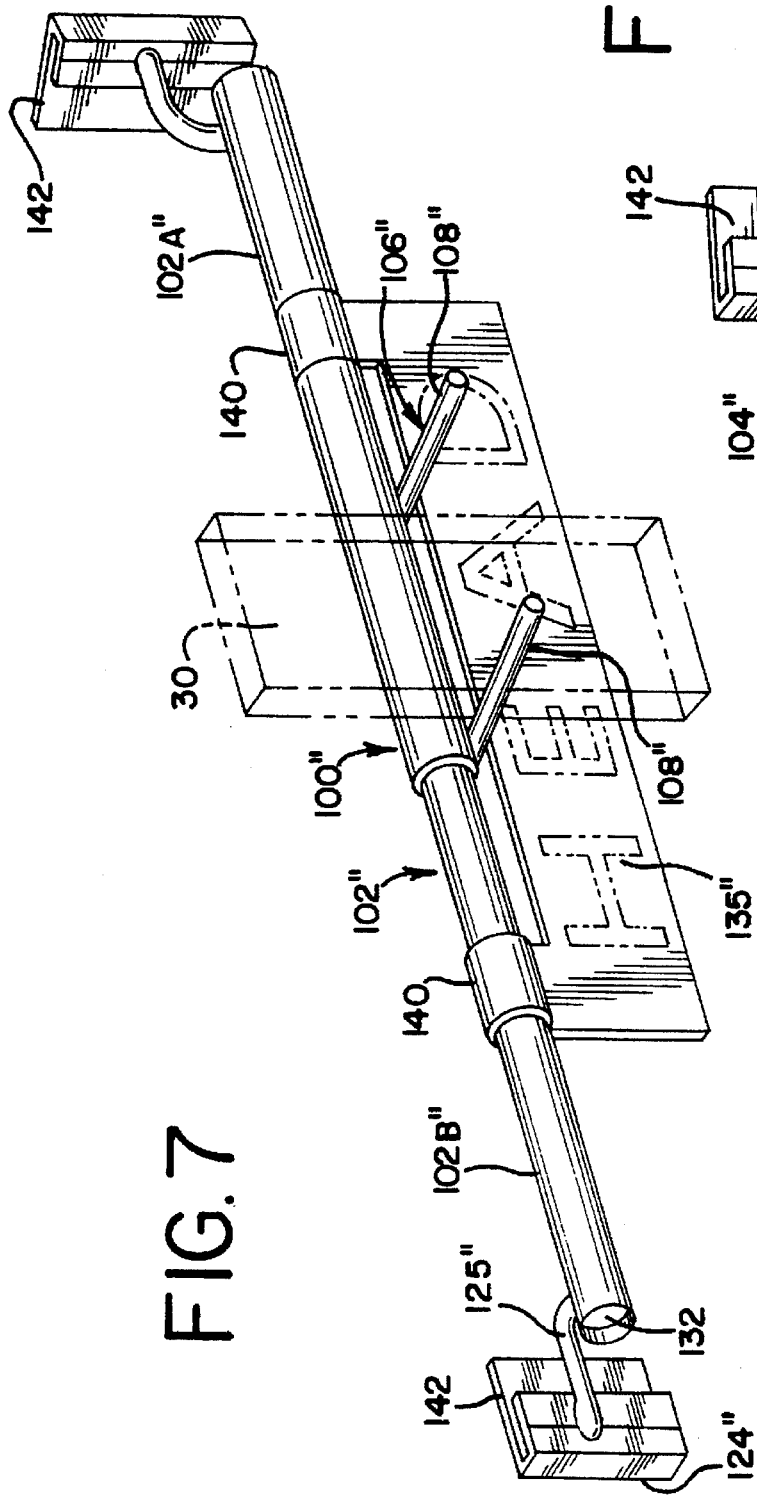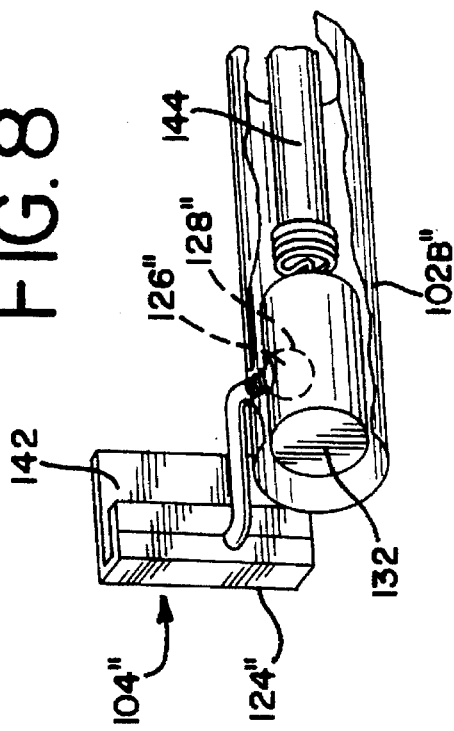

STRUCTURE FOR SUPPORTING ARTICLES AGAINST VEHICLES

BACKGROUND OF THE INVENTION

The present invention relates generally to automotive article support structures, and more particularly to automotive ski supports.

A variety of carriers have been developed for carrying skis on cars, trucks, van or other motor vehicles. Most often, these carriers support skis either on the roof or the rear of the vehicle. Although such carriers effectively convey the skis during travel, these carriers do not adequately support the skis when the skier is placing his or her skis in a manner which protects either the finish of the vehicle or the edges of the skis.

Typically, when a skier reaches a ski destination, he or she must put on their ski boots at the car, collect their skis and walk to the lift station. Sometimes, it is possible for a skier to put his or her skis on at the car and ski over to the lift station. In either situation, as well as in preparing to leave a ski area, it is common for a skier to place his or her ski against their vehicle. The skis are usually leaned against the vehicle in an upright position and often, the skis may slide off of the vehicle into the surrounding snow or environment. This sliding may damage the exterior finish of the skier's vehicle, because of the sharpened metal edges found on downhill skis. This sliding may also damage the metal edges of the skis if the skis are not adequately supported against or on the car, leading to less than desired performance due to dents and chips incurred therein, if the skis should slip off the car and fall to the ground.

Accordingly, a need exists for a vehicle article support structure which may be easily attached to and removed from a vehicle and which provides a support structure for supporting elongated articles, such as skis, in an upright position along the exterior surface of the vehicle and which protects the skis and the finish of the vehicle.

Some article carriers are known which support certain articles, such as guns and fishing rods, in an upright position, as demonstrated by U.S. Pat. No. 3,266,633, issued Aug. 16, 1966. This patent describes a portable gun or rod holder having a support member which is magnetically mounted to the exterior surface of a vehicle. A ski support device known as the SkiStander™ is available which consists of a plastic bracket having a magnetic base. This device also relies upon magnetic attraction to adhere to the side of a vehicle. The magnets require a metallic surface for mounting of the support structure and therefore a user is limited in the number of areas of a vehicle to which the structure may be affixed. For example, the magnets preclude the use of the support structure at the elevation of the glass portion of the vehicle. Additionally, magnetic-style attachments may not be effective in the winter months due accumulation of snow, slush, ice or the like upon the exterior of the vehicle.

The present invention is therefore directed to an article support structure which is easily attached to and removable from vehicles, particularly the window portions thereof, which provides a support structure for holding elongated articles, such as skis, in a substantially upright position against a vehicle in order to protect the vehicle finish and the edges of the skis.

SUMMARY OF THE INVENTION

In general, the present invention includes an adjustable support bar, or beam having two interengaging, telescoping members which combined, are adapted to engage two opposing edges of a vehicle window or door, such as window or door moldings. The support bar includes one or more support members which extend generally transversely therefrom to define support areas upon the support bar.

As herein set forth in greater detail, the present invention also utilizes engagement means disposed at opposite ends of the support bar which are adapted to engage the window or door moldings of a vehicle no matter what is the particular configuration of the molding. In this regard, the engagement means includes a universal-style joint partially disposed within the opposite ends of the support bar which permit engagement clips thereof to adopt a variety of positions, thereby permitting the present invention to be used on a variety of different vehicle body configurations, while still maintaining the support bar in a desired level position set off from the exterior surface of the vehicle body. In a preferred embodiment, this engagement means takes the form of a ball and socket connection between the support bar and the engagement clips.

Still further, the support bar may include a planar surface thereon which may be used for application of graphics and advertising upon the support bar.

These and other objects, features and advantages of the present invention will be apparent through a reading of the following detailed description, taken in conjunction with accompanying drawings, wherein like reference numerals refer to like parts.

BRIEF DESCRIPTION OF THE DRAWINGS

In the course of the description, reference will be made to the attached drawings in which:

FIG. 5 is an enlarged partial sectional view of the article support structure of FIG. 1, taken along lines 5—5 thereof and illustrating the manner of engagement with a vehicle door or window molding;

FIG. 6 is a longitudinal sectional view of a second embodiment of an article support structure constructed in accordance with the principles of the present invention also in place upon a vehicle;

FIG. 7 is a perspective view of a third embodiment of an article support structure constructed in accordance with the principles of the present invention; and, FIG. 8 is an enlarged partial perspective view of an end portion of the article support structure of FIG. 7, with a portion of the support member removed for clarity, illustrating the engagement means thereof.

DETAILED DESCRIPTION OF THE PREFERRED EMBODIMENTS

Figure 1:
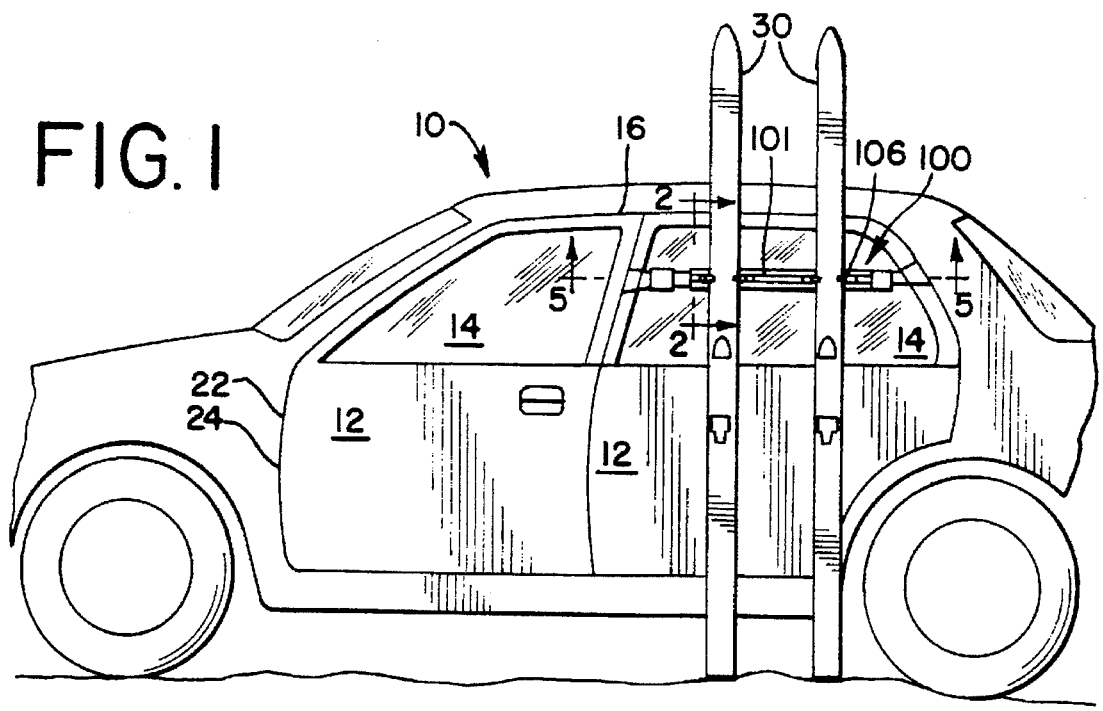
FIG. 1 is an elevational view of a vehicle with an article support structure constructed in accordance with the principles of the present invention disposed thereon and supporting a pair of skis.

Turning now to FIG. 1, an article support structure constructed in accordance with the principles of the present invention is shown generally at 100 in place upon a vehicle 10 and supporting a pair of elongated articles, illustrated as skis 30, in a generally upright position against the side of the vehicle 10. The vehicle 10 shown is conventional and includes one or more doors 12, each of which has an associated window portion 14. Each of the doors 12 has an edge 16 which separates it from the remainder of the body portion 18 of the vehicle 10. The edge 16 is at least partially defined by a molding 20 on some vehicle models which substantially surrounds the window portion 14 of each door 12 and often also surrounds at least a remaining portion of the door 12. Some vehicle models do not have their windows entirely surrounded by a molding as described below. As is conventional, the doors 12 are mounted in openings 22 of the vehicle body and thus, their edges 16 extend within channels 24 created by the interfitting of the doors 12 within the frame door openings and occurring between the doors 12 and the body frame 26.

Prime, ', and double prime, ", designations shall be used in association with the reference numerals to identify elements which are common to the various embodiments of the invention which are described in detail hereinafter.

The article support structure 100, illustrated as a ski support 101, is attached to a vehicle door 12 in the general vicinity of the window portion 14 thereof. The ski support 101 is seen to include an elongated support bar, or beam 102, 102', which extends lengthwise along the vehicle 10. As best viewed in FIGS. 3 and 5–6, the support bars 102, 102' include two interengaging cooperating members 102A, 102A', 102B, 102B'. The interengaging members 102A, 102B preferably share the same cross-sectional configuration, shown in FIGS. 1–5 as square and in FIGS. 6–8 as circular. One member 102A may be slightly larger than the other member 102B so that the members telescopically engage each other and so that the support bars 102, 102' are capable (as explained more fully below) of a preselected amount of expansion to fit a variety of vehicle window spacings.

Figure 2:
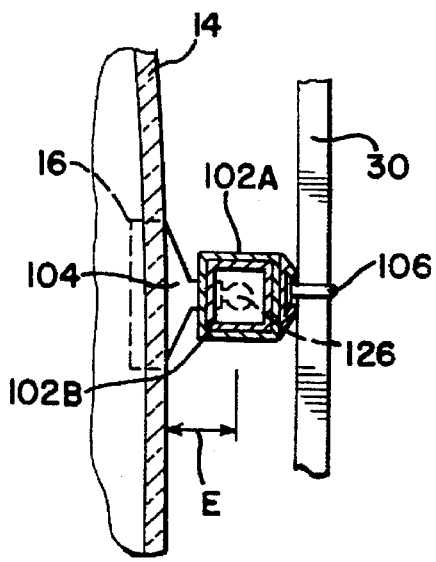
FIG. 2 is a partial sectional end view of the article support structure of FIG. 1 taken along lines 2—2 thereof.
Figure 3:
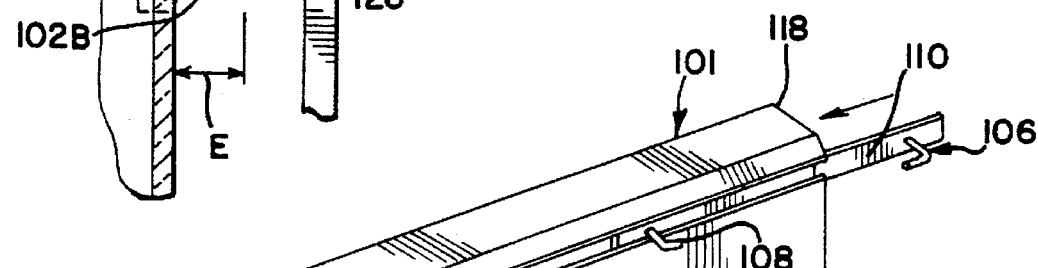
FIG. 3 is a perspective view of the support bar of the article support structure of FIG. 1.
Figure 4:
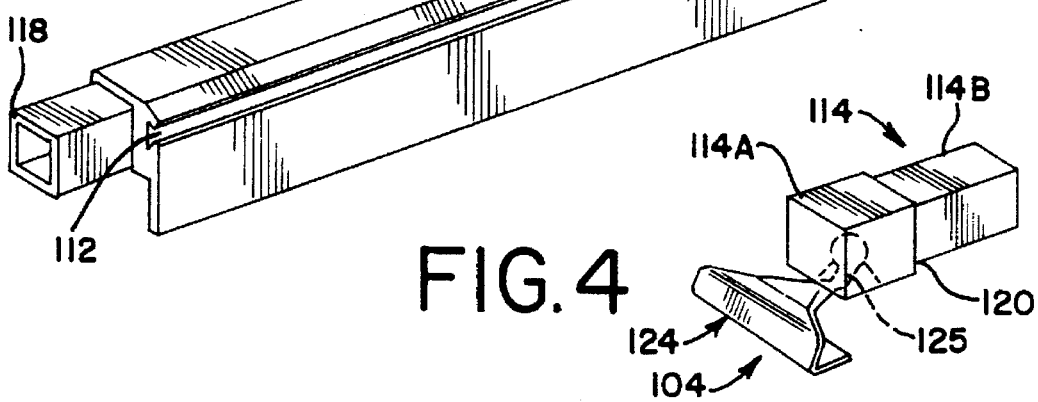
FIG. 4 is an enlarged view of the engagement end of the article support structure of FIG. 1.

In order to reliably engage the vehicle 10, the support bars 102, 102' preferably include means for engaging the vehicle, illustrated as engagement clips 104, 104' disposed at opposite ends of the support bars 102, 102'. These engagement means serve to not only position the support bar 102 away from the vehicle along the exterior surface of the window 14 as best illustrated in FIGS. 2 & 5, but also to releasably engage the vehicle along the edges 16 of the doors 12 as illustrated in FIGS. 1 & 5. Although the support bar 102, 102' are illustrated in the drawings as engaging the vehicle at the edges 16 of the door/window molding 20, it will be understood that the engagement clips 104, 104', 104" may also engage the vehicles at direct edges of the windows on vehicle models where there is no such surrounding molding, such as a Pontiac Trans-Am.

Preferably, the engagement means, by way of its engagement clips 104, 104', 104" also has an extent "E" which supports the skis off of the exterior surface 13 of the vehicle 10 so as to substantially prevent the skis, especially the sharpened metal edges thereof from causing dents, scratches or nicks on the vehicle. The one support bar interengaging member 102A in which the other member 102B nests is preferably provided with an article engagement means, illustrated in FIGS. 1–3, as a ski clip 106.

End pieces 114, 116 are associated with the support bar 102 and cooperate therewith to provide the support bar 102 with a desired measure of adjustability. In this regard, as illustrated in FIG. 5, the end pieces 114, 116 include enlarged head portions 114A, 116A which are relatively larger than the support bar 102 and which engage the end edges 118 thereof. Shaft portions 114B, 116B extend from the head portions 114A, 116A and are of a smaller dimension than the support bar 102 so that they engage the ends 105 thereof in a nesting relationship. The end piece head and shaft portions are separated by shoulders 120 which abut the ends 118 of the support bar 102 as shown. The end pieces 114, 116 are interconnected by a resilient member, illustrated as spring 122, which serves to maintain the engagement clips 104 in contact with the vehicle at all times by applying an inwardly directed tension force thereto along the axis of the support bar 102. Resilient members other than springs may be used, such as bungee cords 144 or the like.

The ski clip 106 preferably has one or more ski engagement members, illustrated as rods 108 which extend generally transversely from the support bar 102 in order to provide a means to retain the skis 30 in place on the structure 100. Each clip 106 may be attached to a retention plate 110 which may be received within a longitudinal slot 112 formed on one of the two support bar members 102A. The slot may be formed most easily by extrusion or other similar process in the support bar member 102A or it may be formed in a separate member which is subsequently affixed to the support bar 102. The slot 112 also permits a user to insert as few or as many ski clips 106 as the user decides for support purposes, with two such ski clips 106 being illustrated in FIGS. 1 and 5.

In order to provide a "universal" nature to the engagement aspect of the support bar 102, the engagement clips 104 engage the support bar end pieces 114, 116 in a manner by which they are easily manipulatable by the user. This manipulation permits the present invention to be used on virtually any vehicle in that the engagement clips 106 are not statically fixed with respect to the support bar 102, but they may move relative thereto so as to reliably engage the edges 16 of the window or door molding 20 of a variety of vehicles. This engagement is illustrated in FIGS. 5 & 6.

In this regard, each engagement clip 104 preferably includes articulation means, illustrated in the form of an engagement hook 124 extending from a shaft 125, which is in turn connected to a ball member 126. The ball members 126 are received within corresponding sockets 128 disposed in the end pieces 114, 116 of the support bar 102. The ball members 126 may rotate within their corresponding sockets 128 throughout a range of 360°, typically defining a cone it their rotation. This rotational movement further occurs in a plane which is generally transverse to the axis of the support bar 102 in the sense that any arbitrary point chosen on the engagement shafts 125 will define a plane in its rotation. The shafts 125 of the engagement clips 106 may be fixedly connected to their associated ball members 126 such as by forming them as a single piece, as illustrated in FIG. 5, by hingedly connecting them, as illustrated in FIG. 6 wherein the engagement shaft 125' includes a hinge, or pivot connection 130' which joins it to the ball member 126', or by means of a threaded connection, as illustrated in FIG. 8. This articulation means is important because it permits the user to mount the support bar on a variety of different vehicle models and maintain the support bar in a somewhat level position with respect to the ground and also to maintain a relatively even set-off (shown by "E") from the vehicle body. This articulation means also permits the present invention to be used on vehicles in which the engagement points may be different, such as the Pontiac Trans-Am described above, in which the vehicle door will have a molding on one side and a glass edge on the other side.

The engagement of the ball members 126, 126' with the support bars 102, 102' may also vary such as is shown in the Figures, wherein the ball members 126 engage sockets 128 formed in the opposing end pieces 114, 116 or wherein the ball members 126' are seated within sockets 128' formed in the ends 117 of the end pieces 114', 116' and are retained therein by way of threaded caps 131 of the support bar 102'. Alternatively, as illustrated in the third embodiment of FIGS. 7 & 8, the ball members 126" may be received within sockets 128" formed within plug members 132 which are received within the support bar members 102A", 102B" and are maintained in place therein by cooperation between the internal spring member 122" and the ball elements 126".

The engagement clips 104", as illustrated in FIGS. 7 & 8, may further include in their hook portions 124", a flexible insert member 142 which sits inside of the hooks 124" and effectively follows the configuration thereof. Such members 142 may be formed from a suitable elastomeric compound in order to reduce the likelihood of the hooks 124 marring the vehicle molding 20. This flexible insert 142 also provides the engagement hooks 124" with the ability to conform to the configuration of the molding 20 to ensure reliable engagement with and mounting to the vehicle 10.

The support structure may also further include a means for displaying a visual indicia, such as graphics, ski manufacturer's logos or trademarks or the like. This display means may take the form of a panel 135 which may be attached to or formed as part of one of the support bar telescoping members (FIG. 5) or as illustrated in FIG. 7. The visual display panel 135" may also either be of a "slip-on" style or a "snap-on" style having clip-on collars 140 which engage the exterior of the telescoping members 102A", 102B". The visual indicia may still be further applied to the support bar members themselves.

It will be appreciated that the embodiments of the present invention which have been discussed are merely illustrative of some of the applications of this invention and that numerous modifications may be made by those skilled in the art without departing from the true spirit and scope of this invention.

We claim:

1. An article support structure for attachment to an automobile and for supporting an elongated article in a substantially upright position, comprising:

an elongated support beam having two opposing ends, the support beam including engagement means disposed at said two opposing ends for engaging a portion of the exterior surface of said automobile in the vicinity of a door of said automobile, the engagement means including articulation means for permitting limited movement of said engagement means with respect to said support beam, to thereby be adaptable to engage different contoured surfaces of said automobile, and article support means extending outwardly from said support beam cooperating with said support beam to define a support area along said support beam which supportingly engages said article and supports it in said upright position.

2. The article support structure as defined in claim 1, wherein said support beam includes two elongated, telescoping members.

3. The article support surface as defined in claim 2, wherein said telescoping members are hollow and include an adjustment means having a spring member disposed within said telescoping members and extending therealong, the spring member being attached at opposing ends to a pair of retention members at least partially engaging said telescoping members, whereby said spring member applies a tensioning force to said telescoping members to cause said support beam opposing ends to draw toward each other.

4. The article support structure as defined in claim 1, wherein said articulation means permits limited rotational movement of said engagement means with respect to said support bar, said movement occurring in a plane generally transverse to an axis of said support bar, said articulation means including a ball and socket joint disposed within said support beam.

5. The article support structure as defined in claim 3, wherein said articulation means is operatively connected to said retention members.

6. The article support structure as defined in claim 5, wherein said engagement means includes a pair of engagement clips disposed along said support beam proximate to the ends of said support beams, each of said engagement clips including a leg member and said articulation means includes a ball member converted to said leg member and operatively engaging a socket formed in said stop member.

7. The article support structure as defined in claim 1, further including a planar panel supported along said support beam, said planar panel including visual display means.

8. The article support structure as defined in claim 1, further including a slot extending along a portion of said support beam, the slot receiving at least one of said article support means therein, said slot permitting adjustment of said article support means along a length of said support beam.

9. The article support structure as defined in claim 8, wherein said article support means slidably engages said support beam slot.

10. The article support structure as defined in claim 3, wherein said retention members each include a shoulder which defines two opposing portions of said retention members, a first of said opposing portions being received within said support beam and a second of said opposing portions abuttingly engaging an end of said support beam.

11. The article support structure as defined in claim 3, further including a planar panel disposed on said support beam proximate said slot, said planar panel including visual display means.

12. A ski support structure for attachment to an exterior surface of a vehicle for supporting skis in an upright position spaced away from the vehicle exterior surface and for at least partially preventing contact between the skis and said vehicle exterior surface, comprising:

an elongated support member, the support member having two opposing ends and two vehicle engagement hooks disposed proximate to said support member ends, said engagement hooks being adapted to engage a portion of said vehicle exterior surface for mounting said support member to said vehicle, said engagement hooks at least partially rotatingly engaging said support member, whereby said engagement hooks are capable of rotation with respect to said support member to compensate for mounting variations encountered in attachment of said support member to said vehicle, said engagement hooks including respective shaft portions which extend between said engagement hooks and said support bar and which effectively space said support bar away from said vehicle exterior surface, said support structure further including means for applying a tensioning force to said engagement hooks in order to maintain said engagement hooks in engagement with said vehicle exterior surface, said support member further including support hooks extending away from said support member and generally transverse thereto in order to define ski engagement areas along said support member defined at locations where said support rods intersect with said support member.

13. The ski support structure as defined in claim 12, wherein said support member includes two plug members which engage said support member proximate said opposing ends thereof and said tension force means includes a resilient member interconnecting said plug members.

14. The ski support structure as defined in claim 12, wherein said support member includes two telescoping interengaging members, and said support rods are mounted on an elongated retention plate, said retention plate being received within a slot extending along one of said two telescoping support members, whereby said retention plate and its associated support rods are movable along said support member.

15. The ski support structure as defined in claim 14, wherein said telescoping members have a square cross-section.

16. The ski support structure as defined in claim 12, wherein said support member has a circular cross-section.

17. The ski support structure as define in claim 12, wherein said engagement hooks include balls disposed at ends of their associated shaft portions, said engagement hook balls being received in corresponding socket portions of said support member.

18. The ski support structure as defined in claim 17, wherein said balls engage sockets disposed at opposing ends of said support member and are retained in place by endcaps of said support member.

19. A ski support structure for attachment to an exterior surface of a vehicle for supporting skis in an upright position spaced away from the vehicle exterior surface and for at least partially preventing contact between the skis and said vehicle exterior surface, comprising:

an elongated support member, the support member having two opposing ends and two vehicle engagement hooks disposed proximate to said support member ends, said engagement hooks being adapted to engage a portion of said vehicle exterior surface in proximity of a door of said vehicle for mounting said support member to said vehicle, said engagement hooks being operatively connected to said support member by way of an articulated connection which permits limited rotational movement of said engagement hooks relative to said support member, said limited rotational movement being of a conical nature, whereby said engagement hooks define a cone in their limited rotational movement, said cone being generally transverse to an axis of said support member, whereby said engagement hooks rotation with respect to said support member compensates for mounting variations encountered in attachment of said support member to said vehicle and permits said support member to be attached to said vehicle regardless of the configuration of said vehicle, said engagement hooks including respective shaft portions which extend between said engagement hooks and said support bar and which effectively space said support bar away from said vehicle exterior surface, said support structure further including means for applying a tensioning force to said engagement hooks in order to maintain said engagement hooks in engagement with said vehicle exterior surface, said support member further including support hooks extending away from said support member and generally transverse thereto in order to define ski engagement areas along said support member defined at locations where said support rods intersect with said support member.

* * * * *